(12) United States Patent
Frenkel et al.

(10) Patent No.: US 6,411,798 B1
(45) Date of Patent: Jun. 25, 2002

(54) METHOD OF ASSIGNING FREQUENCIES FOR USE DURING WIRELESS SYSTEM DRIVE TESTING

(75) Inventors: Michael Frenkel, Tiltan (IL); Chang Yu, Plano, TX (US); Valery Budiansky, Netanya (IL)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/321,864

(22) Filed: May 28, 1999

(51) Int. Cl.$^7$ .................................................. H04Q 7/36
(52) U.S. Cl. ...................... 455/67.4; 455/446; 455/458; 455/424
(58) Field of Search ............................... 455/67.4, 423, 455/424, 425, 446, 450

(56) References Cited

U.S. PATENT DOCUMENTS

| | | | | |
|---|---|---|---|---|
| 5,828,963 A | * | 10/1998 | Granhi et al. ............... | 455/450 |
| 5,926,762 A | * | 7/1999 | Arpee et al. ................. | 455/446 |
| 5,946,612 A | * | 8/1999 | Johansson .................... | 455/405 |
| 6,047,186 A | * | 4/2000 | Yu .............................. | 455/446 |
| 6,253,086 B1 | * | 6/2001 | Parantainen et al. ........ | 455/446 |

* cited by examiner

*Primary Examiner*—Daniel Hunter
*Assistant Examiner*—Alan T. Gantt
(74) *Attorney, Agent, or Firm*—John D. Crane; Bracewell & Patterson, L.L.P.

(57) ABSTRACT

An automated method of assigning frequencies to sectors of a wireless telecommunications system for use during a drive test calculates a usage factor for each frequency that is assigned to the system to be tested. The usage factor for a particular frequency is equal to the number of sectors of the system to be tested to which the particular frequency is assigned. The method selects a sector and selects the frequency assigned to the selected sector with the smallest usage factor. The method keys up the selected frequency in the selected sector and keys down that frequency and the adjacent frequencies in each of the other sectors of the system to be tested. The method continues the foregoing sequence of steps until a unique frequency has been keyed up for each sector in the system to be tested.

20 Claims, 6 Drawing Sheets

METHOD OF ASSIGNING FREQUENCIES FOR USE DURING WIRELESS SYSTEM DRIVE TESTING

FIELD OF THE INVENTION

The present invention relates generally to field of wireless telecommunications system design and test, and more particularly to an automated method of assigning frequencies to the sectors of a TDMA or AMPS wireless system for use during wireless system drive testing.

DESCRIPTION OF THE PRIOR ART

One of the tests commonly performed in connection with wireless telecommunications systems is the drive test. During a drive test, a technician or service engineer traverses the area under test with radio frequency measuring and recording equipment. The equipment measures and records the radio frequency signal strength at various locations in each sector or cell of the area under test. The measurements collected during the test are subjected to various analyses to determine characteristics such as cell boundary and coverage area, and to optimize the frequency plan for the network. The results of the drive test are used to adjust antenna configurations and signal strengths, and in the construction of an interference matrix, so as to optimize the system. Drive tests are conducted frequently in order to accommodate growth of system. Drive tests may be repeated for different parts of the network.

Voice channel and control channel frequencies are scarce resources. Under normal operating conditions, several voice channel frequencies are assigned to each cell or sector, and voice channel and control channel frequencies are reused throughout the system. However, during a drive test, it is necessary that each base station of a cell or sector transmit on a unique test frequency. If two or more base stations of the system are using the same test frequency, then the measurements taken in one cell or sector may be influenced by a signal transmitted from the base station of another cell or sector. Additionally, the immediately adjacent frequencies from other sectors or cells may interfere with the measurements taken for a particular frequency at a particular sector or cell. Accordingly, during a drive test, a unique test frequency must be keyed up for each sector, and that frequency and its immediately adjacent frequencies must be keyed down in each of the other sectors of the system.

Currently, cellular operators have to expend two to three weeks of engineering work to plan the frequency assignments for a drive test. During the two to three weeks of planning, the system operator must fix or freeze the frequency plan for the system, which causes great inconvenience to the operator. The engineers do the planning manually and with much trial and error. Many iterations are necessary in order to achieve an optimal plan. In most cases, however, the result is not optimal and it contains mistakes that cause the operator to repeat the process. Additionally, the scripts that operate the mobile switching center during the drive past are written manually. The manual writing of scripts typically requires about two days of engineering timing and is prone to mistakes. Since drive tests are conducted so frequently, a substantial amount of engineering resources are devoted to drive test planning.

It is an object of the present invention to provide an automated method for making drive test frequency assignments and generating drive test switch scripts.

SUMMARY OF THE INVENTION

The present invention provides an automated method of assigning frequencies to sectors of a TDMA or AMPS wireless telecommunications system for use during a drive test. The method of the present invention calculates a usage factor for each frequency that is assigned to the system to be tested. The usage factor for a particular frequency is equal to the number of sectors of the system to be tested to which the particular frequency, or an immediately adjacent frequency, is assigned. The method selects a sector and selects the frequency assigned to the selected sector with the smallest usage factor. The method keys up the selected frequency in the selected sector and keys down that frequency and the immediately adjacent frequencies in each of the other sectors of the system to be tested. The method of the present invention continues the foregoing sequence of steps until a unique frequency has been keyed up for each sector in the system to be tested.

Preferably, the method of the present invention selects the sectors in ascending order starting from the sector with the least number of frequencies assigned to it. For example, the method sorts the sectors of the system in ascending order according to the number of frequencies assigned to said sectors and proceeds through the ordered set of sectors. If, during the process, any sector reaches a minimum number of voice channel frequencies, the method of the present invention makes the remaining frequencies assigned to that sector, and their adjacent frequencies, unavailable for keying down. If a control channel frequency of a particular sector is selected to be keyed down, the method also keys down the backup control channel for that sector.

The method of the present invention is preferably implemented by means of key up and key down scripts that are run during the test. The key up script is formed by inserting the frequency selected for a particular sector in the key up script. The key down script is formed by inserting the selected frequency and the immediately adjacent frequencies in the key down script for any other sector of the system to which any of those frequencies is assigned. The key up script identifies the frequencies to keyed up for each sector during the test. Similarly, the key down script identifies the frequencies to be keyed down for each sector during the test.

The present invention is applicable to both voice channel frequencies and control channel frequencies. The user has the option to choose voice channels as dedicated key up channels, or to use control channels as key up channels, since they are transmitting all the time. The method keys up and down the assigned control channel frequencies until there are no more assigned control channel frequencies available. The method then assigns and keys up control channel frequencies for the remaining sectors from the remaining voice channel frequencies.

DESCRIPTION OF THE PREFERRED EMBODIMENT

Figure 1:
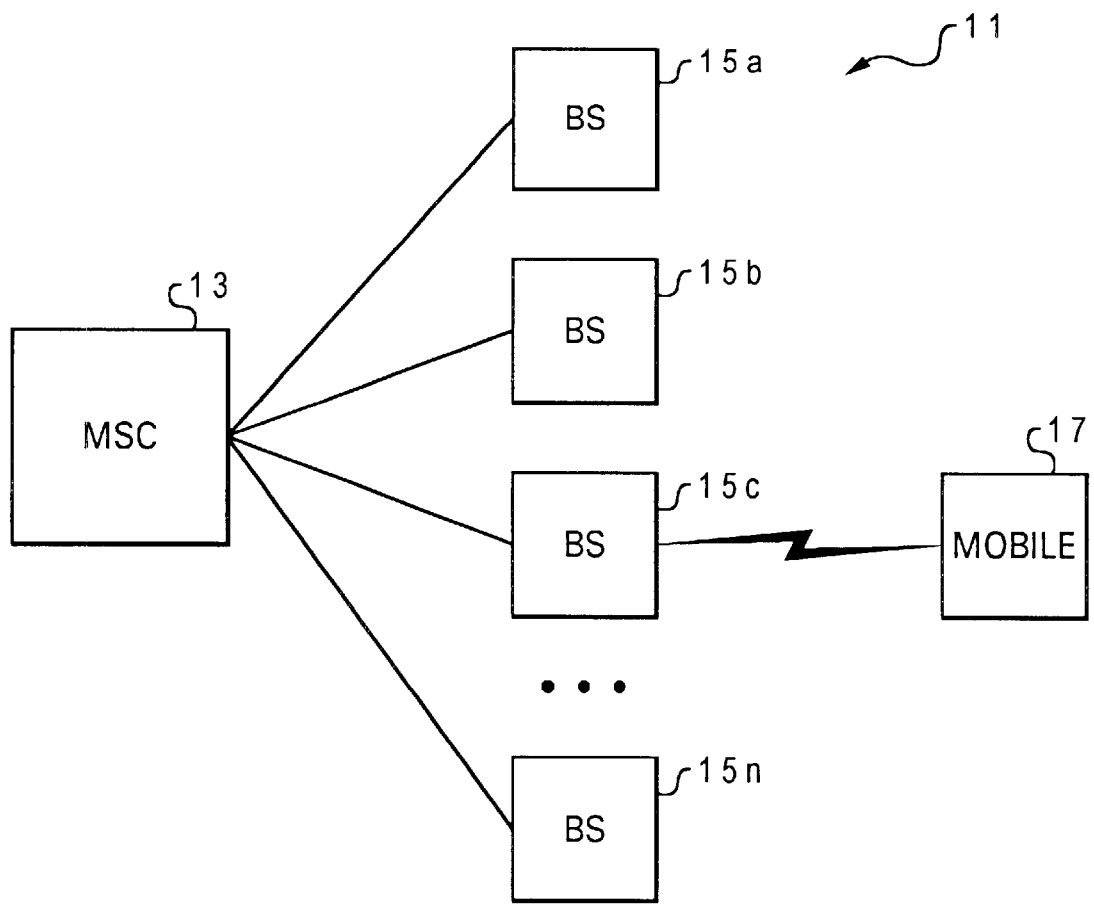
FIG. 1 is a block diagram of a portion of a wireless system.

Referring now to the drawings, and first to FIG. 1, a portion of a wireless telecommunications system is designated generally by the numeral 11. System 11 includes a mobile switching center (MSC) 13, and a plurality of base stations (BS) 15. As is well known to those skilled in the art, a call to a mobile unit 17 is transported from MSC 13 to an appropriate base station 15. The call is transported via radio frequency signal from the base station 15 to the mobile unit 17. During normal operation, each base station 15 operates on one or more assigned voice channel (VCH) frequencies and a control channel (CCH) frequency.

Figure 2:
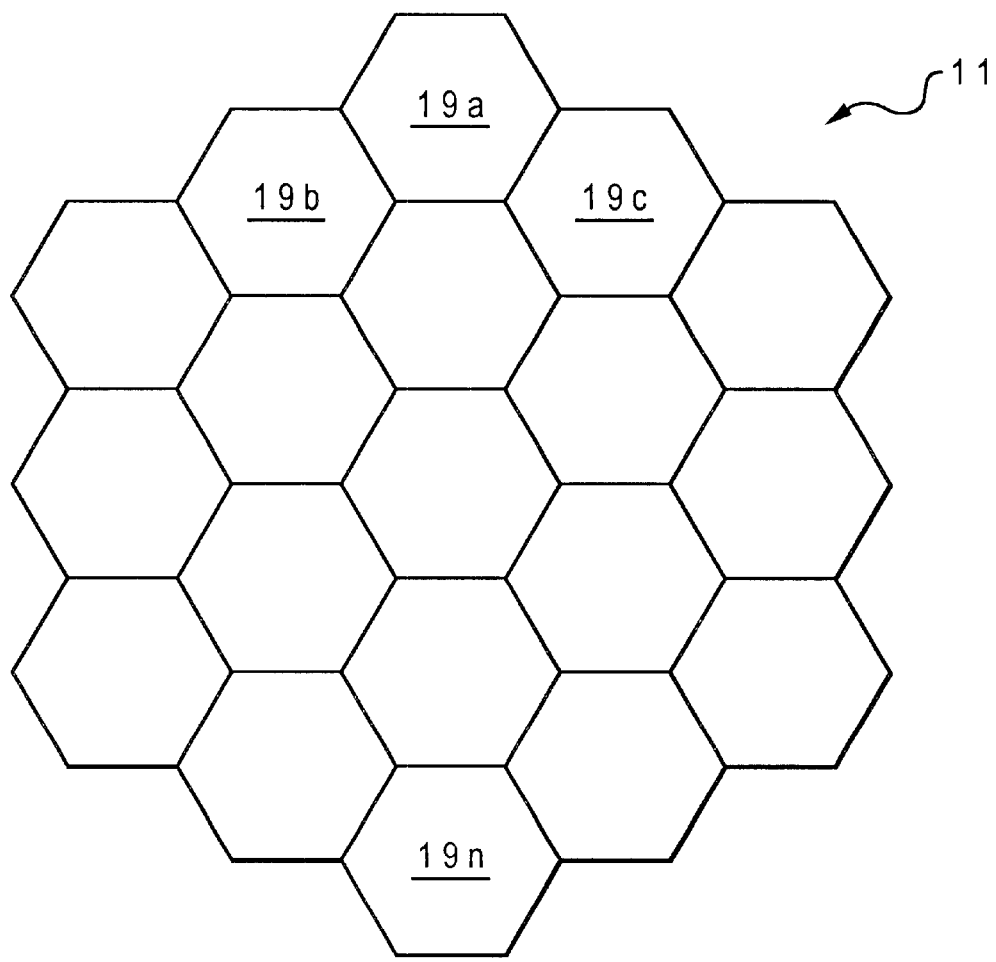
FIG. 2 is a plan view of a set cells in wireless system.

Referring to FIG. 2, which depicts a stylized representation of the system supported by MSC 13, the system comprises a plurality of sectors 19. In FIG. 2, each sector 19 is a cell. It will be understood by those skilled in the art, that a cell may comprise one or more sectors. Each sector 19 is associated with a base station 15. Channels are allocated to base stations 15 so that frequencies may be reused by various sectors 19 throughout the system.

Figure 3:
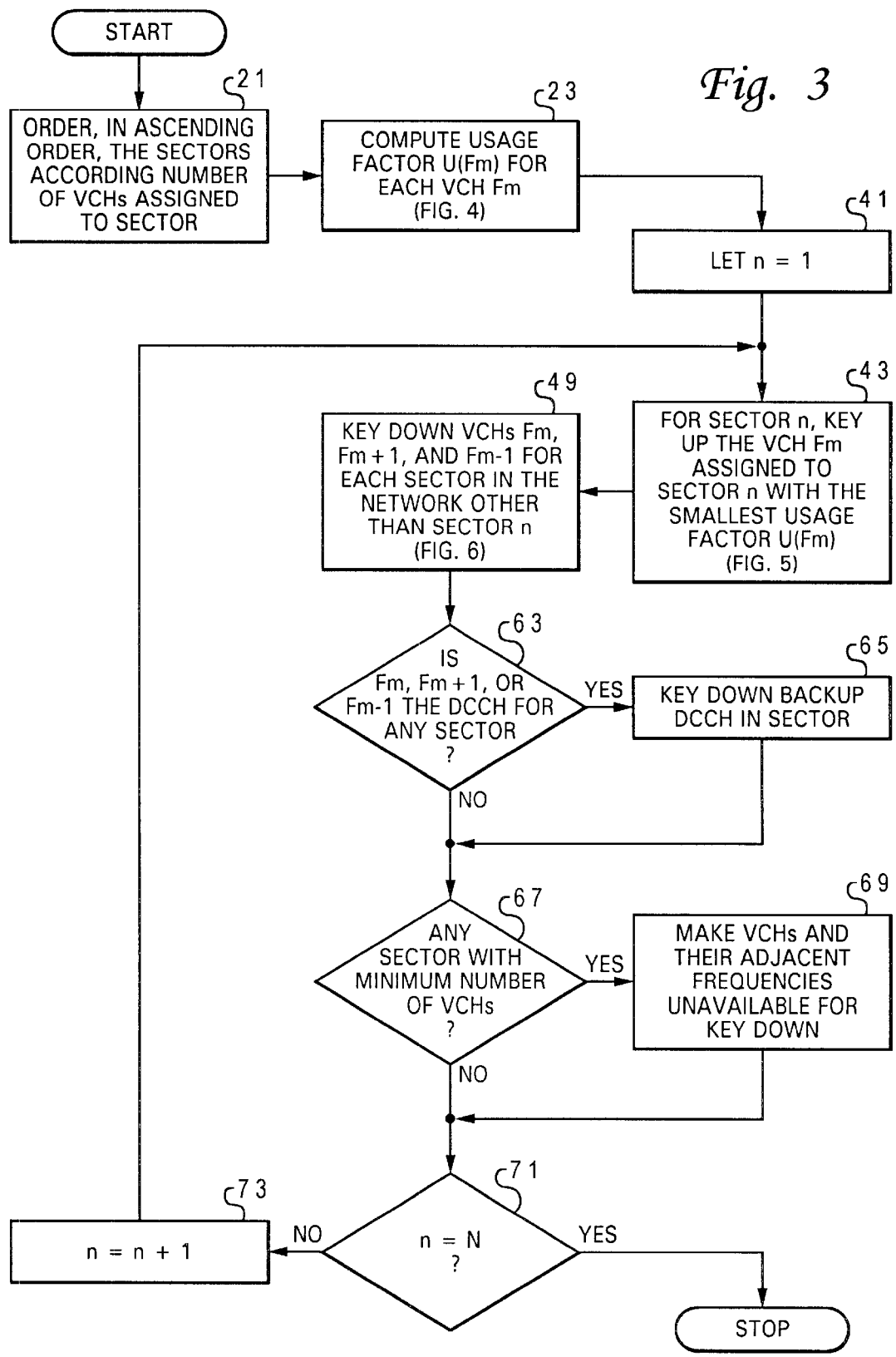
FIG. 3 is a flowchart of voice channel frequency processing according to the present invention.

According to the present invention, a method is provided for assigning to each sector 19 a unique VCH test frequency or a unique CCH test frequency for use during the drive test. Referring now to FIG. 3, there is shown a flowchart of VCH frequency assignment processing according to the present invention. The processing is performed on a suitably programmed computer, such as a personal computer or workstation. In the preferred embodiment, the method of the present invention orders, in ascending order, the sectors of system 11 according to the number of voice channels assigned to the sector, at block 21. In other words, the method of the present invention produces an ordered list of sectors starting with the sector with the fewest number of voice channels assigned to it. Then, the system computes a usage factor for each voice channel, as indicated generally at block 23 and shown in detail with respect to FIG. 4.

According to the present invention, the usage factor is the number of sectors to which a particular channel is assigned. Usage factor provides an indication of the impact upon the system of keying up or down a particular frequency. The more sectors that use a particular frequency, the more sectors that frequency must be keyed down if that frequency is used as a test frequency in a particular sector. Since it is an object of the present invention to minimize the impact upon the system, the present invention attempts to key up and down those frequencies having the smallest usage factors.

Figure 4:
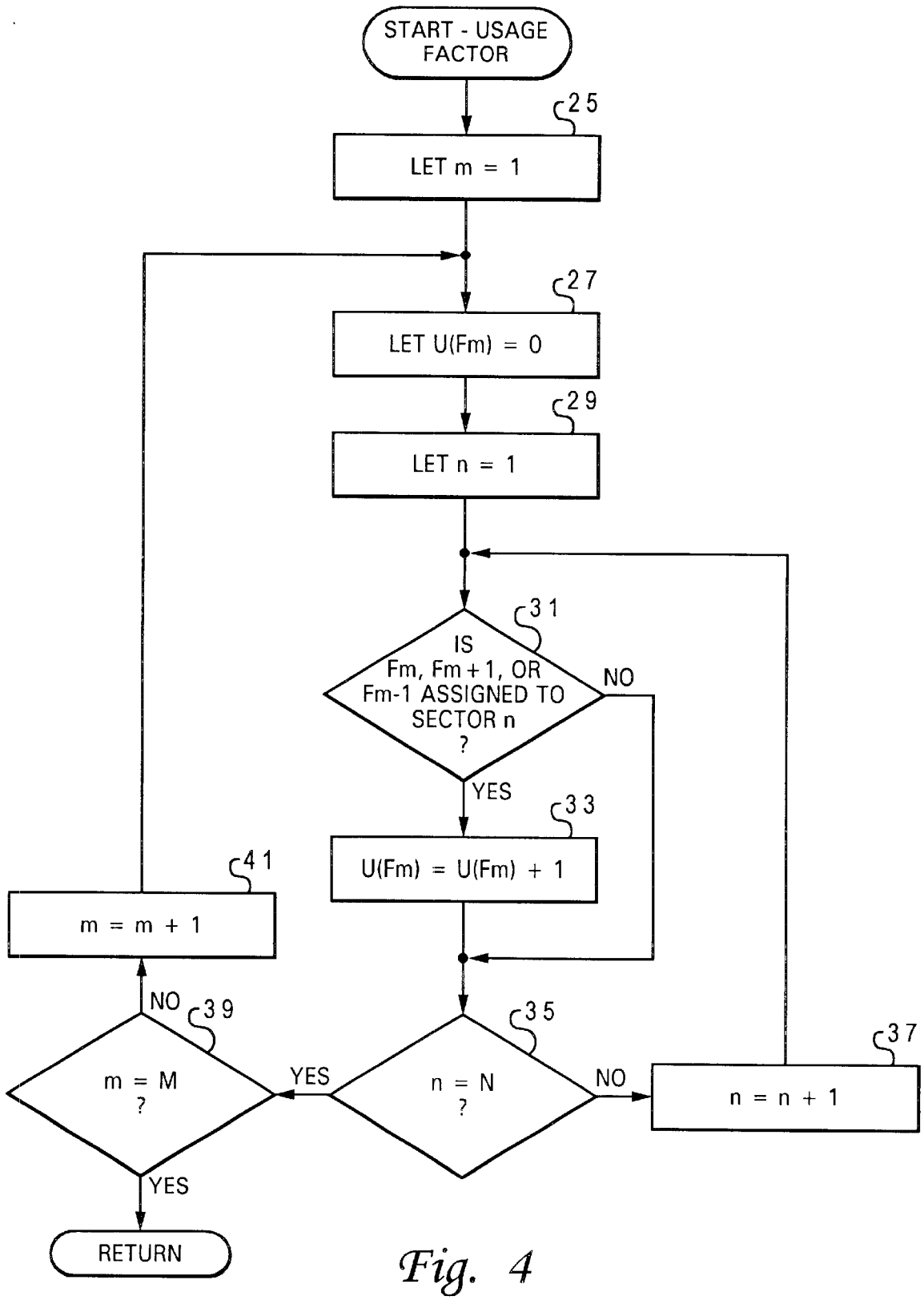
FIG. 4 is a flowchart showing the computation of the usage factors according to the present invention.

Referring now to FIG. 4, there is shown a flowchart of a process for computing usage factor U(Fm). The method sets an index m equal to one, at block 25. Then, the system sets the usage factor U(Fm) for frequency Fm equal to zero, at block 27. Then, the method sets index n, which represents the sector number in the ordered list of sectors, equal to one, at blocked 29. Then, the method determines, for sector n if frequency Fm, frequency Fm+1 (next higher adjacent frequency), or frequency Fm−1 (the next lower adjacent frequency) is assigned to sector n, as indicated that decision block 31. If so, the method increments by one the usage factor U(Fm) count, at block 33. Then, method tests, at decision block 35, if index n is equal to N (the number of sectors in the system). If not, the method increments index n by one, at block 37 and processing returns to decision block 31. If, at decision block 35, all sectors have been tested, then the method tests, at decision block 39, if index m is equal to M, which is the number of frequencies assigned to the system. If not, the method increments index m by one, at blocked 41, and processing returns to block 27 to determine the usage factor U(Fm) for the next frequency. Thus, the method of the present invention performs FIG. 4 processing to compute a usage factor for each frequency used in the system.

Figure 5:
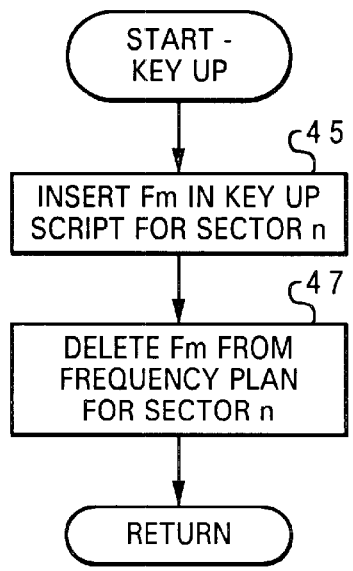
FIG. 5 is a flowchart of key up script generation according to the present invention.

Referring again to FIG. 3, after the method has computed the usage factors at block 23, the method sets an index n equal to one, at block 41. Then, for sector n, the method keys up the voice channel Fm assigned to sector n having the smallest usage factor U(Fm), as indicated generally at block 43 and shown in detail with respect to FIG. 5. Referring to FIG. 5, the method of the present invention keys up the channel Fm by inserting channel Fm in the key up script for sector n, at block 45. Then, the method deletes channel Fm from the frequency plan for sector n, at block 47, and processing returns to FIG. 3.

Figure 6:
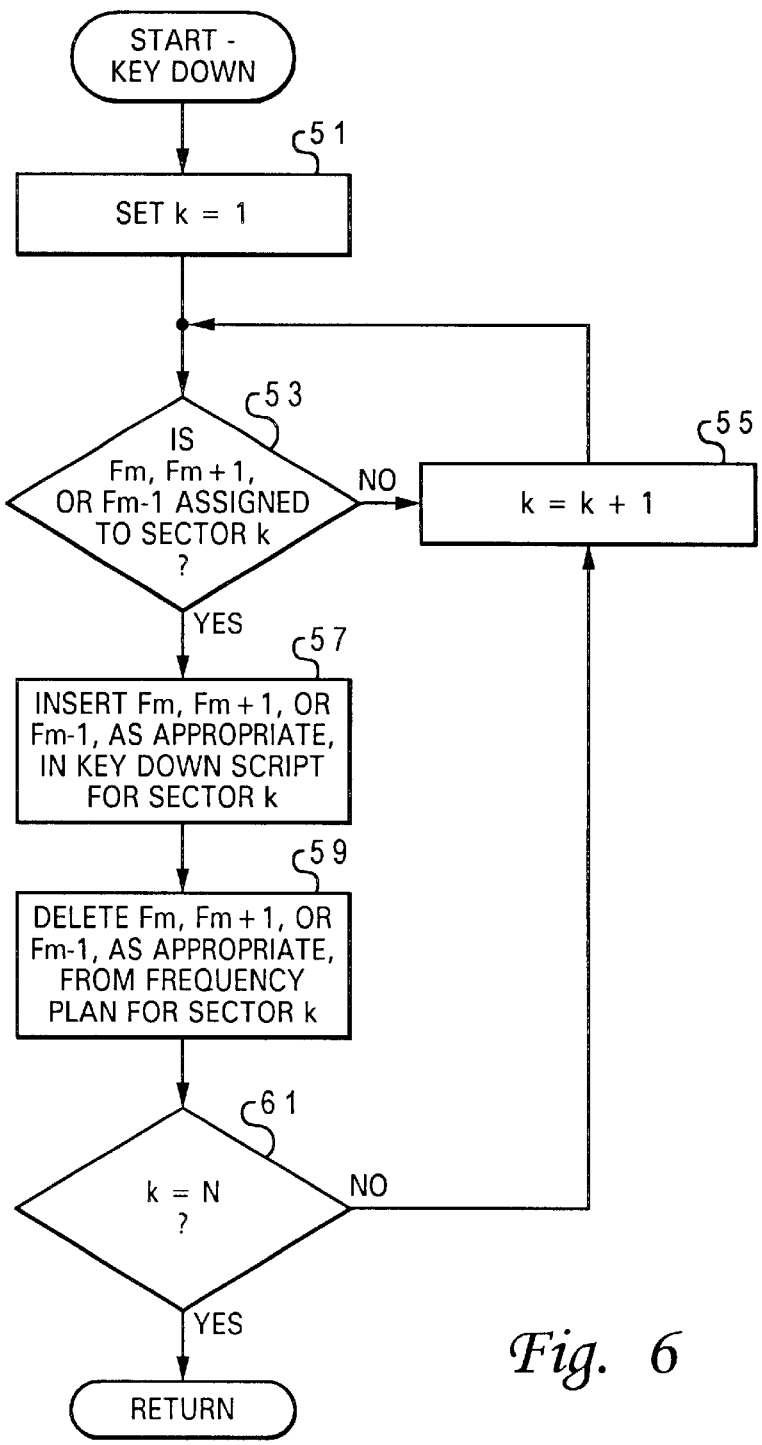
FIG. 6 is a flowchart of key down script generation according to the present invention.

Referring again to FIG. 3, after the method has keyed up voice channel Fm, the method keys down voice channels Fm, Fm+1, and Fm−1 in each sector of the network other than sector n, as indicated generally at block 49 and shown in detail with respect to FIG. 6. Referring now to FIG. 6, the method sets an index k equal to one, at block 51. Then, the method tests, decision block 53, if any one of frequencies Fm, Fm+1, or Fm−1 is assigned to sector k. If not, the method increments index k by one, at block 55, and processing returns to decision block 53. If one of frequencies Fm, Fm+1, or Fm−1 is assigned to sector k, at decision block 53, the method inserts the appropriate frequency (Fm, Fm+1, or Fm−1) in a key down script for sector k, at block 57, and deletes that frequency from the frequency plan for sector k at block 59. Then, the method tests, at decision block 61, if index k is equal to N, the number of sectors in the system. If not, the method increments index k by one, at block 55, and returns to decision block 53. After the key down script has been constructed for all sectors, processing returns to FIG. 3.

After the method has keyed down the appropriate channels for each sector in the network other than sector n, at block 49, the system tests, at decision block 63, if the keyed down frequency is the control channel for any sector in the system. If so, the method keys down the backup control channel in that sector, at block 65, so that the mobile switching center will not automatically key up the backup control channel when the primary control channel is keyed down. Then, the method tests, at decision block 67, if there is any sector with a minimum number of voice channels. If so, the system makes those voice channels, and their adjacent frequencies, unavailable for key down, at block 69. Then, the method tests, at decision block 71, if index n is equal to N, the number of sectors in the network. If not, the method increments index n by one, at block 73, and processing returns to block 43. FIG. 3 processing thus continues until key up and key down scripts have been generated for each sector in the network. At the conclusion of FIG. 3 processing, the method of the present invention will have produced a VCH key up script and a VCH key down script. The original VCH channel plan will contain the remaining frequencies that are available to use for traffic or for spare control channels. A restore script is also generated to recover the original frequency plan at the conclusion of the drive test.

Figure 7:
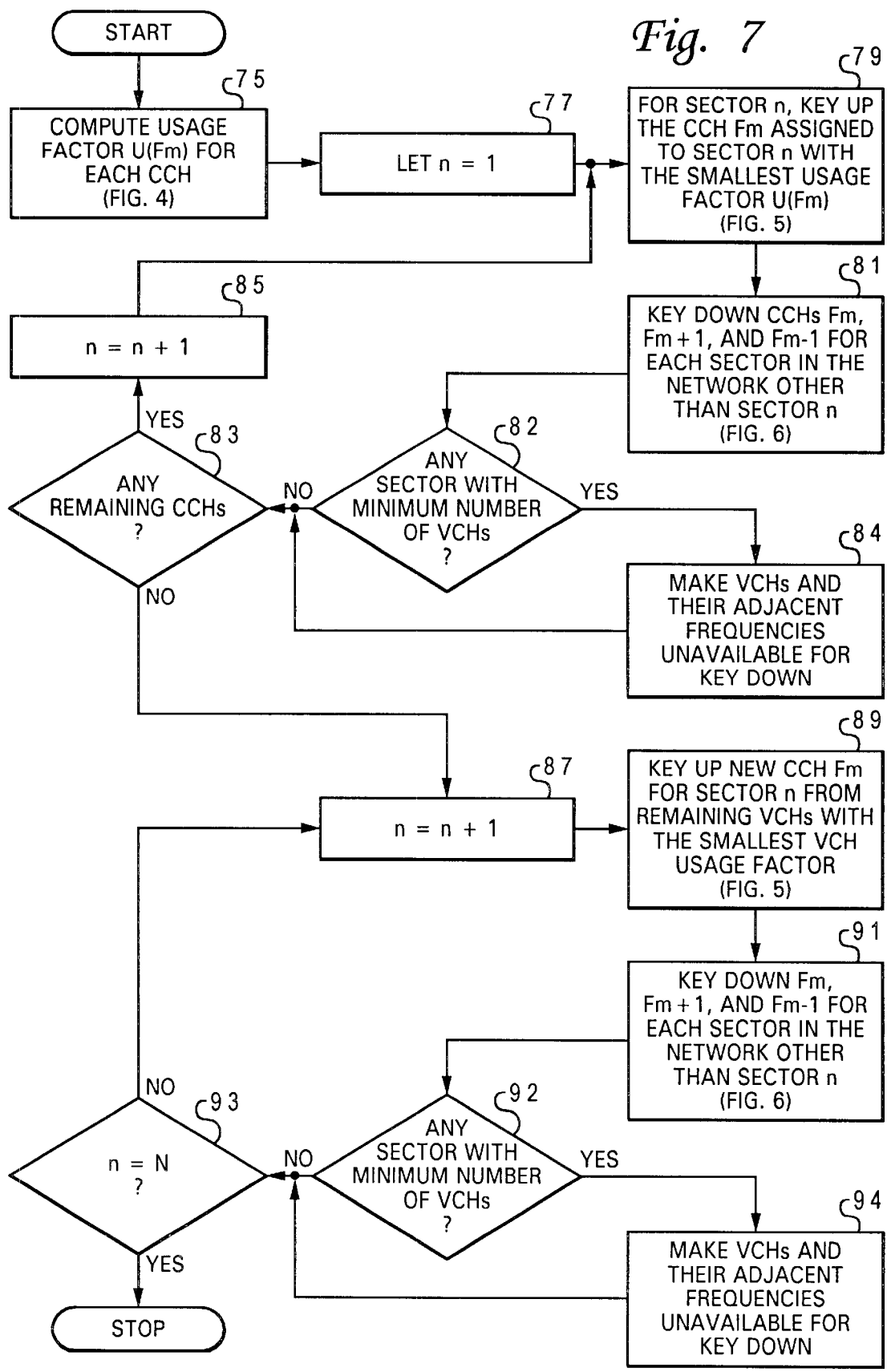
FIG. 7 as a flowchart of control channel processing according to the present invention.

Referring now to FIG. 7, there is shown a flowchart of processing with respect to control channels (CCH). First, the method of the present invention compute a usage factor for each control channel, as indicted generally at block 75 and discussed in detail with respect to FIG. 4. Then, the method sets an index n equal to one, at block 77. The method then keys up the control channel Fm assigned to sector n with the smallest usage factor U(Fm), as indicated generally at block 79 and discussed in detail with respect to FIG. 5. The method then keys down the channels Fm, Fm+1, and Fm−1 for each sector in the network other than sector n, as indicated generally at block 81 and discussed in detail with respect to FIG. 6. The method tests, at decision block 82, if there is any sector with a minimum number of voice channels. If so, the system makes those voice channels, and their adjacent frequencies, unavailable for key down, at block 84.

Since there are a limited number of control channels, there will, in all likelihood, not be enough control channels to service every sector of the network. Accordingly, the method tests, at decision block 83, if there are any remaining control channels. If so, the method increments index n by one, at block 85, and processing returns to block 79. If, at decision block 83, there are no remaining control channels, then the method increments index n by one, at block 87 and keys up a new control channel Fm for the sector selected from the remaining frequencies not keyed up as a voice channel with the smallest usage factor, as indicated generally at block 89, and discussed in detail with respect FIG. 5. Then, the method keys down channels Fm, Fm+1, and Fm−1 for each sector of the network other than sector n, as indicated generally at block 91, and discussed in detail with respect FIG. 6. Then, the method tests, at decision block 92, if there is any sector with a minimum number of voice channels. If so, the system makes those voice channels, and their adjacent frequencies, unavailable for key down, at block 94. Then, the system tests, at decision block 93 if index n is equal to N. If not processing returns to block 87. FIG. 7 processing continues until control channel key up and keyed down scripts have been generated for the system.

From the foregoing, it may be seen that the method of the present invention replaces the current tedious manual planning of drive tests. The method of the present invention decides which frequencies among all the available spectrum should be used to key up during the test and which frequencies are to be keyed down to avoid interference during the test. The method of the present invention produces a key up plan that keeps as many frequencies and sectors in operation during the drive test as possible, thus keeping the impact of the drive test on the network to a minimum. The output of the method of the present invention is scripts that can be directly executed on the switches, thus keeping the manual labor required for drive test planning to a minimum.

The present invention has been illustrated and described with respect to presently preferred embodiments, Those skilled in the art will recognize alternative embodiments of the invention, given the benefit of the this disclosure. Accordingly, the foregoing disclosure is intended for purposes of illustration and not of limitation.

What is claimed is:

1. A method of assigning a frequency from a set of frequencies to a sector in a wireless communication system during a drive test comprising:

calculating a usage factor for each frequency of said set of frequencies, said usage factor being equal to the number of sectors to which said frequency is assigned;

selecting said sector from a set of sectors;

selecting a frequency assigned to said selected sector with the smallest usage factor;

keying up said selected frequency in said selected sector; and keying down said selected frequency in each of the other sectors of said set of sectors.

2. The method as claimed in claim 1, said keying down step including the step of:

keying down the frequencies adjacent said selected frequency in each of said other sectors of said set of sectors.

3. The method as claimed in claim 1, further comprising:

selecting a second sector from said set of sectors;

selecting a frequency assigned to said second sector with the smallest usage factor and which has not been keyed down;

keying up said selected frequency in said second sector; and keying down said selected frequency in each of the other sectors of said set of sectors.

4. The method as claimed in claim 1, wherein said step of selecting a sector from said set of sectors includes the step of:

ordering the sectors of said set of sectors in ascending order according to the number of frequencies assigned to said sectors.

5. The method as claimed in claim 4, wherein said step of selecting a sector from said set of sectors includes the step of:

selecting the sector from said ordered sectors with the smallest number of frequencies assigned to said sector.

6. The method as claimed in claim 1, wherein said step of selecting a sector from said set of sectors includes the step of:

selecting the sector from said set of sectors with the smallest number of frequencies assigned to said sector.

7. The method as claimed in claim 1, wherein said step of keying up said selected frequency includes the steps of:

inserting said selected frequency for said selected sector in a key up script for said drive test.

8. The method as claimed in claim 1, wherein said step of keying down said selected frequency includes the step of:

inserting said selected frequency for each of said other sectors in a key down script for said drive test.

9. The method as claimed in claim 1, further comprising:

determining if any sector has a minimum number of frequencies; and responsive to a determination that a sector has said minimum number of frequencies, making the frequencies of said minimum number of frequencies and their adjacent frequencies unavailable for key down.

10. A computer program product for assigning a frequency from a set of frequencies to a sector of a communication system during a drive test, said program product comprising:

a computer readable medium; and program code on said computer readable medium for:

generating a key up script, said key up script including a unique frequency selected from said set of frequencies for each sector of a set of sectors, wherein said generating step occurs in response to first selecting said unique frequency assigned to a selected sector with the smallest usage factor;

keying up said selected unique frequency in said selected sector; and keying down said selected unique frequency in each other sector of said set of sectors within said communication system.

11. The computer program product as claimed in claim 10, wherein said program code for generating said key up script includes program code for:

calculating a usage factor for each frequency of said set of frequencies, said usage factor being equal to the number of sectors to which said frequency is assigned;

selecting a sector from said set of sectors; and selecting a frequency assigned to said selected sector with the smallest usage factor.

12. The computer program product of claim 10, further comprising program code for:

generating a key down script, said key down script including, for each sector of said set of sectors, a set of frequencies to be keyed down during said drive test.

13. The computer program product of claim 12, wherein said frequencies to be keyed down include the frequencies in said key up script.

14. The computer program product of claim 13, wherein said frequencies to be keyed down include the frequencies immediately adjacent the frequencies in said key up script.

15. The computer program product of claim 10, further comprising program code for:

ordering the sectors of said set of sectors in ascending order according to the number of frequencies assigned to said sectors; and selecting the sector from said ordered sectors with the smallest number of frequencies assigned to said sector.

16. The computer program product of claim 10, further comprising program code for:

determining if any sector has a minimum number of frequencies; and responsive to a determination that a sector has said minimum number of frequencies, making the frequencies of said minimum number of frequencies and their adjacent frequencies unavailable for key down.

17. A communication system comprising:

a plurality of sectors;

at least one frequency assigned to each of said plurality of sectors, wherein said at least one frequency is selected via a selection mechanism comprising:

means for calculating a usage factor for each frequency of said set of frequencies, said usage factor being equal to the number of sectors among said plurality of sectors to which said frequency is assigned;

means for selecting a sector from said set of sectors;

means for selecting a frequency assigned to said selected sector with the smallest usage factor;

means for keying up said selected frequency in said selected sector; and means for keying down said selected frequency in each of the other sectors of said plurality of sectors.

18. The communication system of claim 17, wherein further said selection mechanism further comprises:

means for ordering the sectors of said plurality of sectors in ascending order according to the number of frequencies assigned to said sectors; and means for selecting the sector from said ordered sectors with the smallest number of frequencies assigned to said sector.

19. The communication system of claim 17, wherein further said selection mechanism further comprises means for making the frequencies of said minimum number of frequencies and their adjacent frequencies unavailable for key down.

20. The communication system of claim 17, wherein further said selection mechanism further comprises means for keying down the frequencies adjacent said selected frequency in each of said other sectors of said set of sectors.

* * * * *